US012668537B2

(12) United States Patent
Willms et al.

(10) Patent No.: US 12,668,537 B2
(45) Date of Patent: Jun. 30, 2026

(54) DEVICE AND METHOD FOR THE THERMAL TREATMENT OF A MINERAL FEEDSTOCK

(71) Applicants: thyssenkrupp Polysius GmbH, Beckum (DE); thyssenkrupp AG, Essen (DE)

(72) Inventors: Eike Willms, Dortmund (DE); Patrick Brunelot, Marseilles (FR); Martin Uhde, Ennigerloh (DE); Olaf Ontrup, Herzebrock-Clarholz (DE); Constantin Kimmig, Soest (DE); Jost Lemke, Ennigerloh (DE)

(73) Assignees: thyssenkrupp Polysius GmbH, Beckum (DE); thyssenkrupp AG, Essen (DE)

( * ) Notice: Subject to any disclaimer, the term of this patent is extended or adjusted under 35 U.S.C. 154(b) by 222 days.

(21) Appl. No.: 18/284,045

(22) PCT Filed: Mar. 18, 2022

(86) PCT No.: PCT/EP2022/057196
§ 371 (c)(1),
(2) Date: Sep. 25, 2023

(87) PCT Pub. No.: WO2022/200219
PCT Pub. Date: Sep. 29, 2022

(65) Prior Publication Data
US 2024/0150236 A1 May 9, 2024

(30) Foreign Application Priority Data

Mar. 26, 2021 (BE) .................................... 2021/5236
Mar. 26, 2021 (DE) ..................... 10 2021 203 071.8

(51) Int. Cl.
*C04B 7/44* (2006.01)
*F27B 15/00* (2006.01)
*F27B 15/08* (2006.01)

(52) U.S. Cl.
CPC .......... *C04B 7/4469* (2013.01); *C04B 7/4476* (2013.01); *F27B 15/006* (2013.01); *F27B 15/08* (2013.01); *F27M 2003/03* (2013.01)

(58) Field of Classification Search
CPC ......... C04B 7/434; C04B 7/02; C04B 7/4407; C04B 7/4446; F27B 7/2033; F27B 15/006; F27B 15/08; F27M 2003/03
See application file for complete search history.

(56) References Cited

U.S. PATENT DOCUMENTS

2021/0198142 A1    7/2021    Lemke et al.
2021/0238091 A1    8/2021    Lemke et al.

FOREIGN PATENT DOCUMENTS

CN        106660871 A    5/2017
CN        109443024 A    3/2019
(Continued)

OTHER PUBLICATIONS

English Translation of International Search Report issued in PCT/EP2022/057196, dated Jul. 1, 2022.
(Continued)

*Primary Examiner* — Zakiya W Bates
(74) *Attorney, Agent, or Firm* — thyssenkrupp North America, LLC

(57) ABSTRACT

The present invention relates to apparatus for thermal treatment of a mineral starting material, wherein the apparatus comprises a calciner, wherein the calciner comprises at least a first calciner section and a second calciner section, wherein the first calciner section is arranged vertically, wherein the second calciner section is arranged at an incline, wherein the (Continued)

second calciner section has an angle $\alpha$ between the horizontal and the flow direction of the second calciner section, wherein the angle $\alpha$ is between 20° and 80°, wherein the first calciner section has a first hydraulic diameter $d_{h,1}$, wherein the second calciner section has a second hydraulic diameter $d_{h,2}$, wherein the second hydraulic diameter $d_{h,2}$ is less than or equal to the first hydraulic diameter $d_{h,1}$ multiplied by the sine of the angle $\alpha$.

14 Claims, 4 Drawing Sheets

(56) References Cited

FOREIGN PATENT DOCUMENTS

| CZ | 230353 B1 | 12/1983 | |
| DE | 3417148 A1 | 11/1985 | |
| DE | 34 26 296 A1 | 1/1986 | |
| DE | 34 33 786 A1 | 3/1986 | |
| DE | 37 35 825 A1 | 5/1989 | |
| DE | 10 2018 206 673 A1 | 10/2019 | |
| DE | 10 2018 206 674 A1 | 10/2019 | |
| EP | 0 198 996 B1 | 10/1989 | |
| EP | 1052231 A1 | 11/2000 | |
| EP | 1 310 467 B1 | 3/2010 | |
| EP | 2 759 793 A1 | 7/2014 | |
| EP | 2 868 636 B1 | 8/2016 | |
| EP | 3472544 B1 | 4/2019 | |
| EP | 3 191 425 B1 | 11/2019 | |
| EP | 3 475 637 B1 | 1/2020 | |
| EP | 3828488 A1 | 6/2021 | |
| EP | 3 752 780 B1 | 9/2021 | |
| EP | 3 788 314 B1 | 5/2022 | |
| GB | 1500393 A | 2/1978 | |
| WO | 2008/138903 A1 | 11/2008 | |
| WO | WO-2017220457 A1 * | 12/2017 | ........... C04B 7/4407 |

OTHER PUBLICATIONS

Document submitted in a European Opposition proceeding, identified therein as document D8, asserted in the Opposition to be (as translated from German to English): "Locher, Prof. Dr. Georg, Verbrennungsfuehrung in Drehofenanlagen der Zementindustrie-slides", English abstract included. undated.

Document submitted in a European Opposition proceeding, identified therein as document E15, asserted in the Opposition to be (as translated from German to English): "Haegermann, Dr. Bernd, NOx Abatement in the German Cement Industry, Heidelberg-Cement International VDZ, 2018".

Document submitted in a European Opposition proceeding, identified therein as document E15a, asserted in the Opposition to be (as translated from German to English): "Screenshot—2018".

Document submitted in a European Opposition proceeding, identified therein as document E16, asserted in the Opposition to be (as translated from German to English): "Preheater and Calciner Process Training, Krupp Polysius Corp.", 42 pages. undated.

Document submitted in a European Opposition proceeding, identified therein as document E16a, asserted in the Opposition to be (as translated from German to English): "Screenshot—Preheater and Calciner Process Training, Krupp Polysius Corp". undated.

Document submitted in a European Opposition proceeding, identified therein as document D17 and E17, asserted in the Opposition to be (as translated from German to English): "CEMCAP, CO2 capture from cement production, 2015".

Document submitted in a European Opposition proceeding, identified therein as document E18, asserted in the Opposition to be (as translated from German to English): "Smith, Irene, Co-utilisation of coal and other fuels in cement kilns, IEA Clean Coal Centre, Aug. 2003".

Document submitted in a European Opposition proceeding, identified therein as document E19, asserted in the Opposition to be (as translated from German to English): "Association of German Cement Works, Cement Pocketbook 2002, Verlag Bau+Technik GmbH, English abstract attached, 2002".

Document submitted in a European Opposition proceeding, identified therein as document E20a, asserted in the Opposition to be (as translated from German to English): "SNCR Verfahren in der Zementindustrie: Schlussbericht zu dem IGF-Vorhaben der Forschungsstelle, 2015".

Document submitted in a European Opposition proceeding, identified therein as document E21, asserted in the Opposition to be (as translated from German to English): "Cement Alliance, Webinar #14 Cement Alliance, Calciner Optimizations, 25 pages, Jun. 24, 2020".

Document submitted in a European Opposition proceeding, identified therein as document E21a, asserted in the Opposition to be (as translated from German to English): "CemTeCon Invitation email to Cement Alliance Webinars #14, 2020".

Document submitted in a European Opposition proceeding, identified therein as document E21b, asserted in the Opposition to be (as translated from German to English): "LinkedIn Post for Cement Alliance Webinars #14". undated.

Document submitted in a European Opposition proceeding, identified therein as document E21c, asserted in the Opposition to be (as translated from German to English): "Affidavit of Josef Keuschnigg, 2025".

Document submitted in a European Opposition proceeding, identified therein as document E24, asserted in the Opposition to be (as translated from German to English): "CEMCAP-CO2 capture from cement production, D8.3 Assessment of calciner results Revision 1, 2015".

Document submitted in a European Opposition proceeding, identified therein as document E8, asserted in the Opposition to be (as translated from German to English): "Best Practices for Municipal Waste Management (Bewährte Verfahren zur kommunalen Abfallbewirtschaftung), 320 pages, English abstract included, Oct. 2015".

Document submitted in a European Opposition proceeding, identified therein as document D2, asserted in the Opposition to be (as translated from German to English): "VDZ, Cement Industry Publication Series, CO2 emission reduction potential and technological implications of oxyfuel technology in the cement clinker burning process, Issue 79/2013".

Document submitted in a European Opposition proceeding, identified therein as document D3, asserted in the Opposition to be (as translated from German to English): "ECRA (European Cement Research Academy), Technical Report TR-ECRA-128/2016, ECRA CCS Project: Report on Phase IV.A, 44 pages, 2016".

Document submitted in a European Opposition proceeding, identified therein as document D7, asserted in the Opposition to be (as translated from German to English): "IEA Greenhouse Gas R&D Programme, CO2 Capture in the Cement Industry, Technical Study Report No. 2008/3, 221 pages, Jul. 2008".

Document submitted in a European Opposition proceeding, identified therein as document AA1, asserted in the Opposition to be (as translated from German to English): "Photograph 1 of calcinator from the east side, built in front of the heat exchanger tower, taken by A TEC Productions and Services GmbH". undated.

Document submitted in a European Opposition proceeding, identified therein as document AA2, asserted in the Opposition to be (as translated from German to English): "Photograph 2 of calcinator from the east side, built in front of the heat exchanger tower, taken by A TEC Productions and Services GmbH". undated.

Document submitted in a European Opposition proceeding, identified therein as document AA3, asserted in the Opposition to be (as translated from German to English): "Photograph 3 of the section of the inclined rising calcinator section and fuel feed, taken by A TEC Productions and Services GmbH". undated.

Document submitted in a European Opposition proceeding, identified therein as document AA4, asserted in the Opposition to be (as

(56)                References Cited

OTHER PUBLICATIONS translated from German to English): "Photograph 4 of inclined rising calcinator section, taken by A TEC Productions and Services GmbH". undated.

Document submitted in a European Opposition proceeding, identified therein as document AA5, asserted in the Opposition to be (as translated from German to English): "Photograph 5 of the transition of the inclined calcinator section into the vertical section, taken by A TEC Productions and Services GmbH". undated.

Document submitted in a European Opposition proceeding, identified therein as document AA6, asserted in the Opposition to be (as translated from German to English): "Photograph 6 of the transition of the inclined calcinator section into the vertical section, taken by A TEC Productions and Services GmbH". undated.

Document submitted in a European Opposition proceeding, identified therein as document AB1, asserted in the Opposition to be (as translated from German to English): "Kern, Dr. Stefan, et al., In-line calciner conversion at Lafarge Mannersdorf, ZKG", 3 pages, English translation included.

Document submitted in a European Opposition proceeding, identified therein as document AB2 asserted in the Opposition to be (as translated from German to English): "Lösche Symposium 2017, Cement International Jun. 2017", 4 pages, English translation included.

Document submitted in a European Opposition proceeding, identified therein as document AC1 asserted in the Opposition to be (as translated from German to English): "Sketch in 3D of the calcinator's construction at the Mannersdorf plant". undated.

Document submitted in a European Opposition proceeding, identified therein as document AC2 asserted in the Opposition to be (as translated from German to English): "Technical overview drawing of the calcinator setup of the Mannersdorf plant". undated.

Document submitted in a European Opposition proceeding, identified therein as document AC3 asserted in the Opposition to be (as translated from German to English): "Table of the technical data and key figures for the Mannersdorf, Retznai, Hranice, and Fanna locations as well as related graphics", 5 pages. undated.

Document submitted in a European Opposition proceeding, identified therein as document AC4 asserted in the Opposition to be (as translated from German to English): "Further technical drawing of the calcinator assembly at the Mannersdorf plant". undated.

Document submitted in a European Opposition proceeding, identified therein as document BA1 asserted in the Opposition to be (as translated from German to English): "Closeup of the inclined part of the calcinator". undated.

Document submitted in a European Opposition proceeding, identified therein as document BB1 asserted in the Opposition to be (as translated from German to English): "Michalcik, R., et al., Cement International, Off to New Horizons", English translation included. undated.

Document submitted in a European Opposition proceeding, identified therein as document BC1 asserted in the Opposition to be (as translated from German to English): "Technical drawing of the calcinator assembly at the Hranice plant". undated.

Document submitted in a European Opposition proceeding, identified therein as document BC2 asserted in the Opposition to be (as translated from German to English): "Further Technical drawing calcinator assembly at the Hranice plant". undated.

Document submitted in a European Opposition proceeding, identified therein as document BC3 asserted in the Opposition to be (as translated from German to English): "Further Technical drawing 2 of calcinator assembly at the Hranice plant". undated.

Document submitted in a European Opposition proceeding, identified therein as document CA1 asserted in the Opposition to be (as translated from German to English): "Photograph of Retznai Calcinator". undated.

Document submitted in a European Opposition proceeding, identified therein as document CB1 asserted in the Opposition to be (as translated from German to English): "Kern, Dr. Stefan, Minimising emissions, maximising alternative fuels, World Cement", 6 pages. undated.

Document submitted in a European Opposition proceeding, identified therein as document CC1 asserted in the Opposition to be (as translated from German to English): "Photograph of Werk-Retznei calcinator". undated.

Document submitted in a European Opposition proceeding, identified therein as document CC2 asserted in the Opposition to be (as translated from German to English): "Photograph of Retznai I04-ATEC-GA10-0000000- 0004-B". undated.

Document submitted in a European Opposition proceeding, identified therein as document CC3 asserted in the Opposition to be (as translated from German to English): "Photograph of Ausschreibung Annex 1". undated.

Document submitted in a European Opposition proceeding, identified therein as document CC4 asserted in the Opposition to be (as translated from German to English): "Photograph of Retznai I01-ATEC-GA10- 0000000-0005". undated.

Document submitted in a European Opposition proceeding, identified therein as document DB1 asserted in the Opposition to be (as translated from German to English): "ATEC, Cementzillo Fanna Plant Case Report", 3 pages. undated.

Document submitted in a European Opposition proceeding, identified therein as document DB2 asserted in the Opposition to be (as translated from German to English): "CemTech, Excerpt from a presentation given at Cemtech event in Barcelona". undated.

Document submitted in a European Opposition proceeding, identified therein as document DB3 asserted in the Opposition to be (as translated from German to English): "Presentation Case Report Cementzillo Fanna Plant". undated.

Document submitted in a European Opposition proceeding, identified therein as document DC1 asserted in the Opposition to be (as translated from German to English): "Program for Cemtech Barcelona". undated.

Document submitted in a European Opposition proceeding, identified therein as document DC2 asserted in the Opposition to be (as translated from German to English): "Further Case Report—ATEC-History about Cementizillo", 9 pages. undated.

Document submitted in a European Opposition proceeding, identified therein as document DC3 asserted in the Opposition to be (as translated from German to English): "Internal Drawing of the Fanna plant ". undated.

Document submitted in a European Opposition proceeding, identified therein as document EB1 asserted in the Opposition to be (as translated from German to English): "Adam, Alexander, Lafarge's new kiln line, Cement—International Cement Review", 4 pages. undated.

Document submitted in a European Opposition proceeding, identified therein as document EB2 asserted in the Opposition to be (as translated from German to English): "ZKG International, Sustainable development through continuous optimization", Woessingen. undated.

Document submitted in a European Opposition proceeding, identified therein as document EC1 asserted in the Opposition to be (as translated from German to English): "Photograph 02-Tower 6". undated.

Document submitted in a European Opposition proceeding, identified therein as document EC2 asserted in the Opposition to be (as translated from German to English): "Drawing of overview of Wossingen". undated.

Document submitted in a European Opposition proceeding, identified therein as document D9 and F1 asserted in the Opposition to be (as translated from German to English): "Final Report from the research centers". undated.

Document submitted in a European Opposition proceeding, identified therein as document F2 asserted in the Opposition to be (as translated from German to English): "Fleiger, Dr. Kristina, et al., Oxyfuel: prospects and limits, CEM AI, Cement Intelligence, Aug. 2014".

(56) References Cited

OTHER PUBLICATIONS

Document submitted in a European Opposition proceeding, identified therein as document B1 asserted in the Opposition to be (as translated from German to English): "Statement of Dr. Ing. Volker Hoenig, 2025".

Document submitted in a European Opposition proceeding, identified therein as document D1 and E20 asserted in the Opposition to be (as translated from German to English): "Final Report AIF Project No. 17189". undated.

Document submitted in a European Opposition proceeding, identified therein as document D1.1 and E20a asserted in the Opposition to be (as translated from German to English): "Excerpt from the TIB University Hannover catalog". undated.

Document submitted in a European Opposition proceeding, identified therein as document D10 asserted in the Opposition to be (as translated from German to English): "Koring, Kristina, VDZ Publication of the Cement Industry, Issue 79/201, 2013".

Document submitted in a European Opposition proceeding, identified therein as document D11 asserted in the Opposition to be (as translated from German to English): "ECRA (European Cement Research Academy), CCS Project: Report on Phase IV.A, Technical Report, TR-ECRA-128/2016, 2016".

Document submitted in a European Opposition proceeding, identified therein as document D12 asserted in the Opposition to be (as translated from German to English): "CO2 Capture in the Cement Industry, Technical Study, Report No. 2008/3, IEA Greenhouse Gas R&D Programme, Jul. 2008".

Document submitted in a European Opposition proceeding, identified therein as document D13 asserted in the Opposition to be (as translated from German to English): "Hand, Andreas, Decarbonization and emission reduction with state-of-the-art cement plant equipment, Cement and Building Materials Review, No. 90, Dec. 2022".

Document submitted in a European Opposition proceeding, identified therein as document D14 asserted in the Opposition to be (as translated from German to English): "Hoidalen, Von O., Modernization and increase of capacity of rotary kiln 6 in the Dalen Plant of Norcem A/S, ZKG International, Nr. 3, pp. 132-138, Mar. 1990".

Document submitted in a European Opposition proceeding, identified therein as document D15 asserted in the Opposition to be (as translated from German to English): "Tokheim, Lars-Andre, An Alternative Solution, World Cement, 5 pgs., Nov. 2005".

Document submitted in a European Opposition proceeding, identified therein as document D16 asserted in the Opposition to be (as translated from German to English): "Streit, Norbert et al., Pyro Progressing, World Cement, 5 pgs., Mar. 2020".

Document submitted in a European Opposition proceeding, identified therein as document D17 asserted in the Opposition to be (as translated from German to English): "CEMCAP, CO2 capture from cement production, D8.1 Status Report on Calciner Technolog Revision 2, 2014".

Document submitted in a European Opposition proceeding, identified therein as document D2 asserted in the Opposition to be (as translated from German to English): "Mikulcic, Hrvoje, Numerical modelling of thermochemical processes inside a cement calciner for a cleaner cement production, Doctoral Thesis, Faculty of Mechanical Engineering and Naval Architecture, 2015".

Document submitted in a European Opposition proceeding, identified therein as document D4 asserted in the Opposition to be (as translated from German to English): "Laurien, Eckart, et al., Numerische Strömungsmechanik, Vieweg and Teubner Verlag, Springer Fachmedien Wiesbaden GmbH, English abstract included, 2011".

Document submitted in a European Opposition proceeding, identified therein as document D5 asserted in the Opposition to be (as translated from German to English): "Abbas, Tahir, et al., Recent trends in calciner, ZKG International, No. 5, vol. 62, pp. 53-66, English abstract included, 2009".

Document submitted in a European Opposition proceeding, identified therein as document D6 asserted in the Opposition to be (as translated from German to English): "Bronstein, I. N., et al., Taschenbuch der Mathematik (Pocketbook of Mathematics), Verlag Harri Deutsch , English abstract included, 1993".

* cited by examiner

DEVICE AND METHOD FOR THE THERMAL TREATMENT OF A MINERAL FEEDSTOCK

CROSS REFERENCE TO RELATED APPLICATIONS

This application is a U.S. National Stage Entry of International Patent Application Serial Number PCT/EP2022/057196, filed Mar. 18, 2022, which claims priority to German Patent Application No. DE 10 2021 203 071.8, filed Mar. 26, 2021, and Belgian Patent Application No. BE 2021/5236, filed Mar. 26, 2021, the entire contents of which are incorporated herein by reference.

FIELD

The present disclosure generally relates to an apparatus and a process for the thermal treatment of mineral starting materials, in particular for producing cement clinker.

BACKGROUND

The invention relates to an apparatus and a process for the thermal treatment of mineral starting materials, in particular for producing cement clinker.

A plant for clinker production comprises for example a rotary kiln, a calciner and a preheater. While the material stream of the solid, initially calcareous raw meal mixture and finally cement clinker, passes from the preheater via the calciner into the rotary kiln and then usually into a cooler, the gas flows countercurrently from the rotary kiln to the calciner and from there into the preheater. While in the rotary kiln the material stream of the clinker and the gas stream are run in countercurrent, in the calciner and in the preheater the gas stream and the material stream are in each case in stretches run in cocurrent and subsequently separated in a cyclone. If the solid material is run in cocurrent, the gas stream must also be capable of carrying the material without the material falling out, sedimenting or otherwise precipitating.

In the calciner, combustion of fuel on one hand produces energy in the form of heat while this heat is on the other hand consumed by the endothermic deacidification reaction of the starting material i.e. with emission of $CO_2$. It is therefore useful to introduce the fuel and the starting material into the calciner in proximity to one another, thus also avoiding areas with elevated temperatures.

Fuels employed are typically atomizable fuels, for example coal dust. However, it is becoming increasingly important to use substitute fuels or to increase the proportion thereof, for example to optimize the $CO_2$ balance of the overall process and also to allow use of lower-cost fuels. This also allows improved integration of the cement industry into the circular economy. However, due to their size distribution said substitute fuels are not always atomizable, for example the energy required for comminution to achieve atomizability exceeds economically viable levels. In order to also allow use of non-atomizable substitute fuels, it is current practice to place appropriate combustion chambers at the side of the calciner. If the combustion chamber is for example arranged at the side of the calciner without starting material also being supplied there, the location of energy production by combustion and the location of energy consumption by deacidification are spatially separate.

DE 10 2018 206 673 A1 discloses a process for producing cement clinker having an elevated oxygen content.

DE 10 2018 206 674 A1 discloses a further process for producing cement clinker having an elevated oxygen content.

DE 37 35 825 A1 discloses an apparatus for calcination of pulverulent materials.

Thus a need exists to provide an apparatus and a process which makes it possible to effect combustion of very coarse fuel directly in the calciner.

BRIEF DESCRIPTION OF THE FIGURES

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
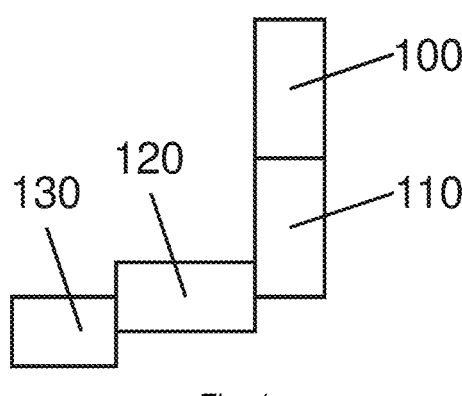
FIG. 1 shows an apparatus for thermal treatment of a mineral starting material.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The apparatus according to the disclosure is used for thermal treatment of a mineral starting material. It is preferably an apparatus for producing cement clinker. However, the apparatus may also be utilized for the thermal treatment of clays or for example lithium ores. The production of cement clinker is hereinbelow used as an example. The apparatus comprises a calciner. The apparatus typically further comprises a rotary kiln. Said kiln is arranged downstream of the calciner with respect to the material stream (starting material to product) and upstream of the calciner with respect to the gas stream. However, the rotary kiln may also be omitted for other thermal treatments and a cooler directly connected to the calciner for example. The apparatus typically further comprises a preheater. The preheater is arranged upstream of the calciner with respect to the material stream (starting material to product) and downstream of the calciner with respect to the gas stream. The preheater consists for example of a number of serially arranged concurrent heat exchangers with downstream separation cyclones. The calciner comprises at least a first calciner section and a second calciner section. The first calciner section is arranged vertically and the second calciner section is arranged at an incline. At an incline is to be understood as meaning that the gas stream through the second calciner section flows neither parallel to the earth's surface nor at an angle of 90° to the earth's surface. The second calciner section has an angle α between the horizontal and the flow direction of the second calciner section. The horizontal is parallel to the earth's surface. The angle α is between 20° and 80°. The first calciner section has a first hydraulic diameter $d_{h,1}$ and the second calciner section has a second hydraulic diameter $d_{h,2}$. The second hydraulic diameter $d_{h,2}$ is less than or equal to the first hydraulic diameter $d_{h,1}$ multiplied by the sine of the angle α.

$$d_{h,2} \leq d_{h,1} \cdot \sin(\alpha)$$

The hydrodynamic diameter $d_h$ is four times the quotient of the flow cross section A transverse to the flow direction divided by the flow circumference P.

$$d_h = 4 \cdot \frac{A}{P}$$

In a tubular body having gas flowing through its entirety, for example a tubular first calciner section of radius r, the flow cross section $A_{tube}$ is equal to the circular cross section $A_{tube}=\pi \cdot r^2$ and the flow circumference $P_{tube}$ is equal to the circumference of a circle $P_{tube}=2 \cdot \pi \cdot r$. Accordingly the hydrodynamic diameter of a tube is $d_{h,tube}=2 \cdot r$ and thus the diameter of the tube. For other geometries a characteristic length is obtained analogously.

In the case of the second hydraulic diameter $d_{h,2}$ it must be noted that upon intended use of a solid fuel this forms a solid bed within the second calciner section which in turn has the result that in regular operation it is not the entire cross sectional area of the second calciner section that is available to the gas stream but rather only the cross section reduced in size by the bed of the solid fuel. In the context of the disclosure a solid bed is to be understood as meaning all types of layers of solid material comprising heaps or dumped layers. Likewise, the flow circumference P is not the circumference of the second calciner section but rather the circumference P through which the gas stream flows via the bed of the fuel and the upper portion of the second calciner section. However, if a liquid fuel is used, for example high-viscosity oil residues, the film thickness thereof may in some cases be negligible, thus making it possible in this case to use the geometry of the second calciner section as an adequate approximation.

The advantage of the apparatus according to the disclosure is that by adjusting the cross-section according to the angle α of the second calciner section, the flow velocity along the flow direction is increased such that the velocity component in the z-direction, i.e. perpendicular to the earth's surface, is at least equal to the flow velocity in the vertical first calciner section. Since the velocity component in the z-direction in the second calciner section is thus at least as high as the velocity component in the z-direction in the first calciner section, the load-bearing capacity of the gas flow for the starting material in both calciner sections is at least the same and a separation of the starting material from the gas flow in the second calciner section arranged at an incline can be avoided. This means that no mineral starting material is lost there on account of being deposited on or in a solid fuel. Due to the narrowing and thus altogether higher flow velocity in the second calciner section the effect of reducing the velocity component in the z-direction in the second calciner section is thus at least compensated by the inclined arrangement and accordingly the load-bearing capacity is at least kept constant via the relationship between diameter $d_h$ and the angle α according to the disclosure.

In a further embodiment of the disclosure, the first calciner section and the second calciner section are configured to have a gas stream flow through them from bottom to top.

In a further embodiment of the disclosure the first calciner section is arranged below the second calciner section. It is preferable when the first calciner section is arranged directly adjacent to the second calciner section.

In a further embodiment of the disclosure the apparatus comprises a third calciner section. The third calciner section is arranged vertically. The third calciner section is arranged above the second calciner section. It is preferable when the second calciner section is arranged directly adjacent to the third calciner section.

In a further embodiment of the disclosure the second calciner section has a first second starting material feed. The first second starting material feed is arranged in the lower 20% of the second calciner section, i.e. at the inlet for the gas flow. The first second starting material feed supplies the starting material into the gas stream of the second calciner section from above or into the gas stream of the second calciner section from the side. The starting material for the calciner is in particular the material for thermal treatment that has been preheated in a preheater, for example and preferably a meal for clinker production. This shall also comprise that the first second starting material feed is arranged in the first calciner section immediately upstream of the second calciner section.

The first calciner section typically also has at least a first starting material feed. The starting material is thus typically and preferably supplied to the calciner in sub-portions to achieve a spatial distribution of the decarbonation over the entire calciner and thus also to achieve a distribution of the energy consumption over the calciner. In the case of atomizable fuels this is done spatially adjacently. Thus, a first sub-amount of starting material is supplied via the first starting material feed and a second sub-amount is supplied via the first second starting material feed.

Correspondingly a third calciner section may preferably have at least a first third starting material feed arranged in it.

In a further embodiment of the disclosure the second calciner section additionally has a second starting material feed. The second starting material feed is arranged in the middle region of the second calciner section, wherein the second starting material feed supplies the starting material into the gas stream of the second calciner section from above or into the gas stream of the second calciner section from the side. As a result the starting material is supplied with greater spatial distribution which also has the result that the energy consumption by the decarbonation occurs with greater spatial distribution, thus leading to uniformization of the temperature and thus of the reaction conditions. It goes without saying that the second calciner section may also have further second starting material feeds to achieve further uniformization. It is preferable when the supplying of the starting material via the first second starting material feed is carried out in a constant manner and the second starting material feed is used variably in order in particular to dynamically adapt the supplied amount of starting material to the typically varying liberated amount of energy from a substitute fuel. Thus in the case of a substitute fuel with a relatively low calorific value less starting material would be supplied via the second starting material feed and in the case of a substitute fuel with a relatively high calorific value more starting material would be supplied via the second starting material feed.

In a further embodiment of the disclosure the second calciner section additionally has a third second starting material feed. The third second starting material feed is arranged in the upper 20% of the second calciner section, wherein the third second starting material feed supplies starting material into the gas stream of the second calciner section from above or into the gas stream of the second calciner section from the side. As a result the starting material is supplied with greater spatial distribution which also has the result that the energy consumption by the decarbonation occurs with greater spatial distribution, thus leading to uniformization of the temperature and thus of the reaction conditions. It goes without saying that the second calciner section may also have further second starting material feeds to achieve further uniformization.

In a further embodiment of the disclosure a second fuel feed for a solid fuel is arranged at the upper end of the second calciner section. By way of example and preferably a substitute fuel may be supplied via the second fuel feed. Examples of substitute fuels include household, industrial or commercial waste, waste tires, sewage sludge and biomass. The calorific value of substitute fuels can vary greatly. Substitute fuels can therefore also be introduced as a mixture of different fractions to achieve a certain calorific value. Since the fractions having a lower calorific value and coarser size distribution are normally cheaper, this also achieves a cost optimization. The inclined arrangement of the second calciner section thus also makes it possible to burn non-atomizable substitute fuel directly in a calciner in immediate proximity to the chemical reaction of the starting material to afford the product and thus to provide the energy close to the reaction thereof. In order to allow better combustion of certain substitute fuels the lower side of the second calciner section may be stepped or the lower side of the second calciner section may have a forwards or backwards moving grate, wherein a forwards or backwards moving grate may also be stepped. In the context of the disclosure the lower side is the floor, i.e. the region along which a solid would slide due to gravity. Analogously, the upper side and the lateral sides would then be the part that confines the gas stream in the upwards or lateral direction.

In a further embodiment of the disclosure the second calciner section has an angle $\alpha$ between the horizontal and the flow direction of the second calciner section, wherein the angle $\alpha$ is between 30° and 70°, preferably between 35° and 60°, more preferably between 40° and 55°, particularly preferably between 40° and 50°. An optimum is to be selected here. The steeper the second calciner section, the greater the velocity component of the gas stream in the z-direction and the more easily the particles remain in the gas stream. On the other hand a flat construction is advantageous especially for substitute fuels having a coarse size distribution and/or a high moisture content.

In a further embodiment of the disclosure the second calciner section is arranged below the first calciner section and a controllable bypass is arranged parallel to the second calciner section. The lower end of the second calciner section may for example also be aligned with the first calciner section. In this case the upper end of the second calciner section and the lower end of the first calciner section are for example connected to one another by a horizontal connecting piece, wherein the controllable bypass is then arranged directly vertically below the first calciner section.

In a further aspect the disclosure relates to a process for operating an apparatus for thermal treatment of a mineral starting material. It is preferably a process for operating an apparatus for producing cement clinker. However, the apparatus may also be utilized for the thermal treatment of clays or for example lithium ores. The production of cement clinker is hereinbelow used as an example. The process is performed in an apparatus comprising a calciner having a vertical first calciner section and an inclined second calciner section. The process is preferably performed in an apparatus according to the disclosure. During operation a gas stream is passed through the first calciner section and the second calciner section. By way of example and preferably the gas stream originates from a rotary kiln. By way of example and preferably the gas stream contains mainly oxygen and, in addition, the $CO_2$ produced in the rotary kiln by combustion and residual deacidification of the starting material (typically around 10% of the total deacidification). The gas stream preferably contains less than 20% by volume of nitrogen, particularly preferably less than 15% by volume of nitrogen, preferably about 50% to 70% by volume of oxygen. The abovementioned values relate to dry gas, i.e. without taking water into account. It is preferable when the inflowing gas stream comprises sufficient oxygen for combustion of the fuels supplied to the calciner. According to the disclosure the apparatus is operated such that at any point in the second calciner section the Froude number Fr is equal to or greater than the minimum Froude number Fr in the first calciner section. The Froude number Fr is the velocity component of the gas stream in the vertical direction $v_z$ divided by the square root of the product of acceleration due to gravity g and the hydraulic diameter $d_h$.

$$Fr = \frac{v_z}{\sqrt{g \cdot d_h}}$$

where:

$$d_h = 4 \cdot \frac{A}{P}$$

The hydraulic diameter is four times the quotient of the flow cross section A perpendicular to the flow direction divided by the flow circumference P.

While in the vertical first calciner section the velocity component of the gas stream in the vertical direction $v_z$ is equal to the flow velocity of the gas stream v, in the inclined second calciner section the angle $\alpha$ must be taken into account. Here, the velocity component of the gas stream in the vertical direction $v_z$ is the flow velocity of the gas stream v multiplied by the sine of the angle $\alpha$.

$$v_z = v \cdot \sin(\alpha)$$

However, it is necessary to take into account that the flow velocity is not a constant. The flow velocity within the calciner is altered by various processes. Temperature differences lead to differences for instance. In regions with higher temperatures, the gas wants to occupy more space, thus increasing the velocity v. Likewise the deacidification of the starting material results in emission of $CO_2$ which increases the amount of substance and thus also leads to an increase in the flow velocity. The fuel can also result in an increase in the amount of substance, for example due to water liberated or formed during combustion. These effects mean that the Froude number is not constant at constant geometry within a calciner section but rather differs according to location.

Since the Froude number is to be considered as a measure of the load-bearing capacity of the gas stream for the starting material which is in the form of a solid and the load-bearing capacity in the second calciner section must be at least as high as in the first calciner section, the Froude number in the second calciner section must be greater everywhere than the minimum Froude number in the first calciner section. However, it must be taken into account that the angle of inclination a does not enter the whole flow velocity v, but only its z-component $v_z$, into the calculation and also only contributes to the load-bearing capacity. The focus is only on the minimum in the first calciner section since the load capacity must be sufficient here too. An increase in the Froude number, for example through liberation of $CO_2$ during deacidification, will result in higher values locally if a constant geometry within the first calciner section is assumed.

The calciner is particularly preferably operated with turbulent flow. As a result, the velocity profile of the flow exhibits only small variations over the width of the flow. In the case of laminar flow the velocity of the gas stream has a distribution over the width which is zero at the edge and has a maximum in the middle. This would make the load bearing capacity location-dependent, thus complicating process management.

In another embodiment of the disclosure the calciner is operated with an atmosphere comprising less than 25% nitrogen, preferably comprising less than 15% nitrogen, more preferably comprising less than 10% nitrogen, particularly preferably comprising less than 5% nitrogen.

In a further embodiment of the disclosure the Froude number in the second calciner section is selected to be greater than 0.7, preferably greater than 2. Furthermore, the Froude number in the second calciner section is selected to be smaller than 9, preferably smaller than 4.

In a further embodiment of the disclosure in the second calciner section starting material is supplied at least two positions via a first second starting material feed and a second second starting material feed. This is effected spaced apart from one another along the flow direction. This achieves a uniformization of the reaction and thus of the energy consumption and thus of the temperature.

In a further embodiment of the disclosure, a solid fuel is supplied and burnt in the second calciner section. By way of example and preferably a substitute fuel may be supplied via the second fuel feed. Examples of substitute fuels include household, industrial or commercial waste, waste tires, sewage sludge and biomass. The calorific value of substitute fuels can vary greatly. Substitute fuels can therefore also be introduced as a mixture of different fractions to achieve a certain calorific value. Since the fractions having a lower calorific value are normally cheaper, this also achieves a cost optimization. The inclined arrangement of the second calciner section thus also makes it possible to burn non-atomizable substitute fuel directly in a calciner in immediate proximity to the chemical reaction of the starting material to afford the product and thus to provide the energy close to the reaction thereof. In order to allow better burning of certain substitute fuels the lower side of the second calciner section may be stepped or the lower side of the second calciner section may be conveyed using a forwards or backwards moving grate, wherein a forwards or backwards moving grate may also be stepped.

In a further embodiment of the disclosure a solid fuel with a chunk size of at least 90% of the mass of the fuel of more than 50 mm, preferably more than 70 mm, particularly preferably of 100 mm, is supplied in the second calciner section.

In a further embodiment of the disclosure an atomizable fuel is supplied in the first calciner section. In addition, starting material is supplied via a first starting material feed in the first calciner section. Fuel and starting material are preferably supplied spatially adjacently to one another to provide a spatial connection between energy production and energy consumption.

All illustrations are purely schematic, not to scale and are only used to elucidate the features of the disclosure.

FIG. 1 shows an apparatus for thermal treatment of a mineral starting material, for example a plant for production of cement clinker. The plant comprises a preheater 100, a calciner 110, a rotary kiln 120 and a cooler 130. The material, for example raw meal made from limestone is applied at the top, passes through the plant in the recited sequence and may be withdrawn from the cooler 130 as clinker. The gas flow is passed from the rotary kiln 120 into the calciner 110 and from there into the preheater 100 in countercurrent to the material stream.

Therefore in the following four exemplary calciner embodiments shown the gas stream enters from below from the direction of the rotary kiln 120 and flows upwards. The calciner 110 in each case has at least one cyclone separator not shown in the exemplary embodiments at the upper end.

In the following, identical reference numerals are used for identical elements and the differences between embodiments are elaborated in the description.

Figure 2:
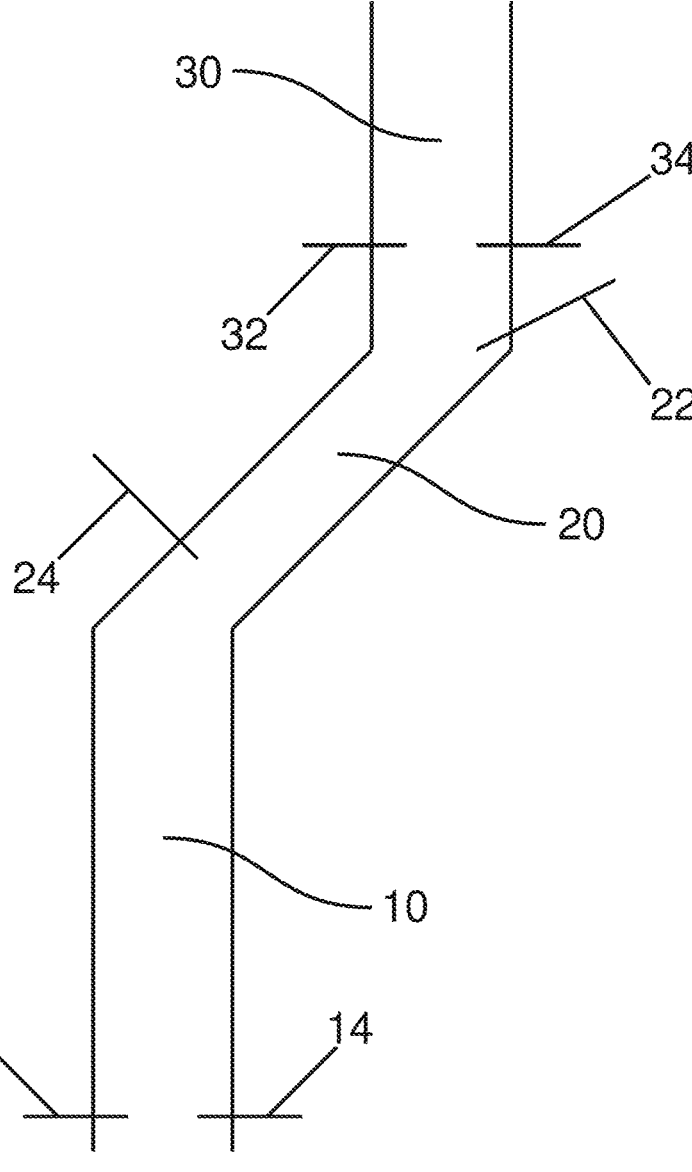
FIG. 2 shows a first calciner.

FIG. 2 shows a first calciner section 10 arranged vertically, thereabove a second calciner section 20 inclined at an angle of 45° and thereabove a third calciner section 30 arranged vertically. The first calciner section 10 has a first fuel feed 12 for an atomizable fuel, for example coal dust, and a first starting material feed 14, by means of which starting material from the preheater 100 is supplied. The combustion of the fuel in the first calciner section 10 forms energy which is used for the deacidification of the starting material, thus generating CO2. In the second calciner section 20 a solid fuel is supplied from above through the second fuel feed 22, for example via a screw, and said fuel is then burnt on the inclined surface of the second calciner section 20. Combustion residues, for example metal constituents of the fuel, fall through the first calciner section 10 and may then be withdrawn therebelow. The second calciner section 20 further comprises a first second starting material feed 24, by means of which starting material from the preheater may likewise be added. Arranged above the second calciner section 20 is a third calciner section 30 which comprises a third fuel feed 32 and a first third starting material feed 34.

As indicated in FIG. 2 the cross section of the second calciner section 20 is smaller than the cross section of the first calciner section 10. For example the cross section is about 30% smaller than the cross section of the first calciner section 10, which corresponds to the sine of 45°.

Figure 3:
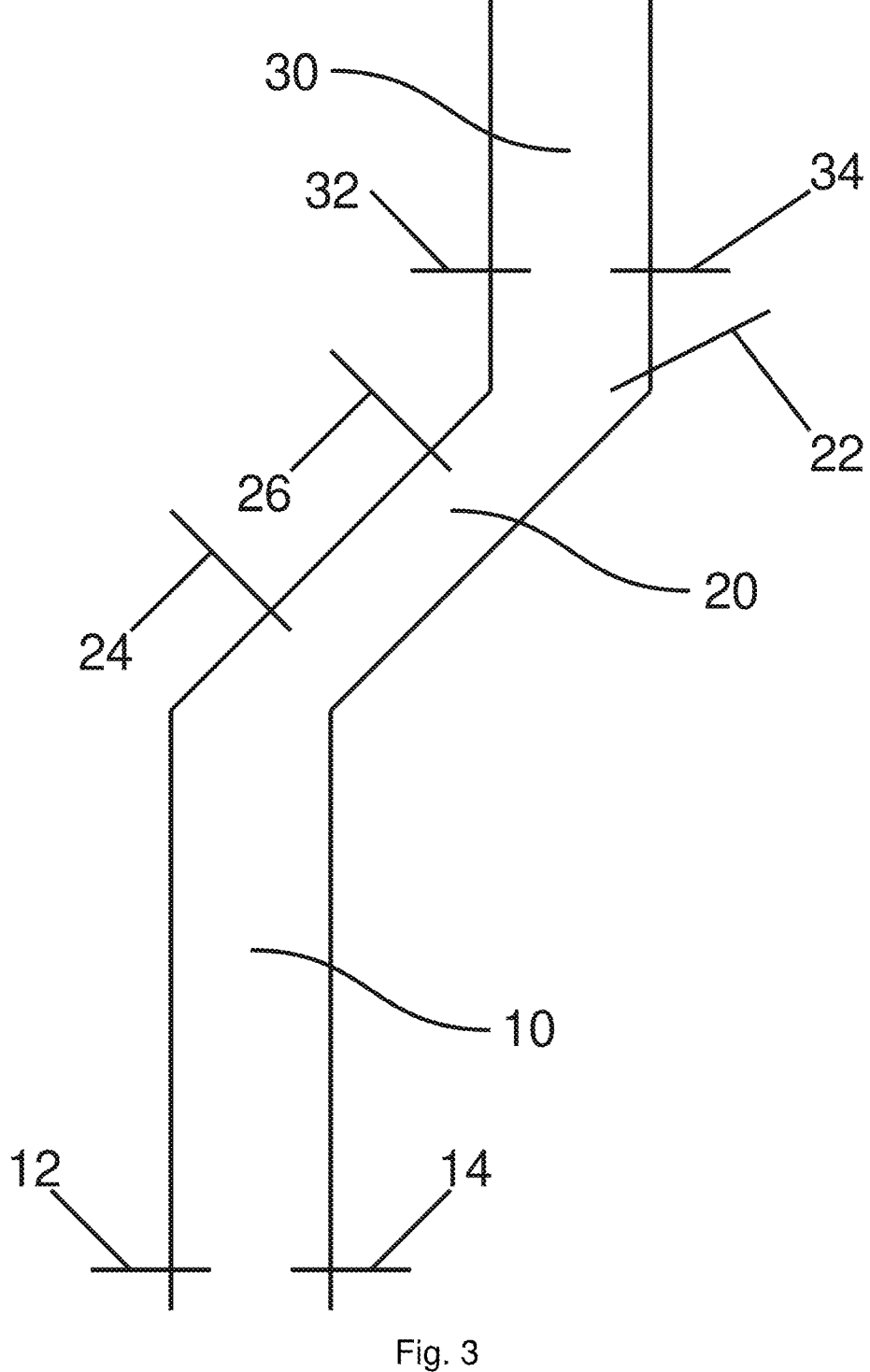
FIG. 3 shows a second calciner.

In the second embodiment of the calciner 110 shown in FIG. 3 the second calciner section 20 comprises, additionally to the first embodiment shown in FIG. 2, a second second starting material feed 26 which makes it possible to achieve better uniformization of the energy consumption and thus of the temperature in the second calciner section 20.

Figure 4:
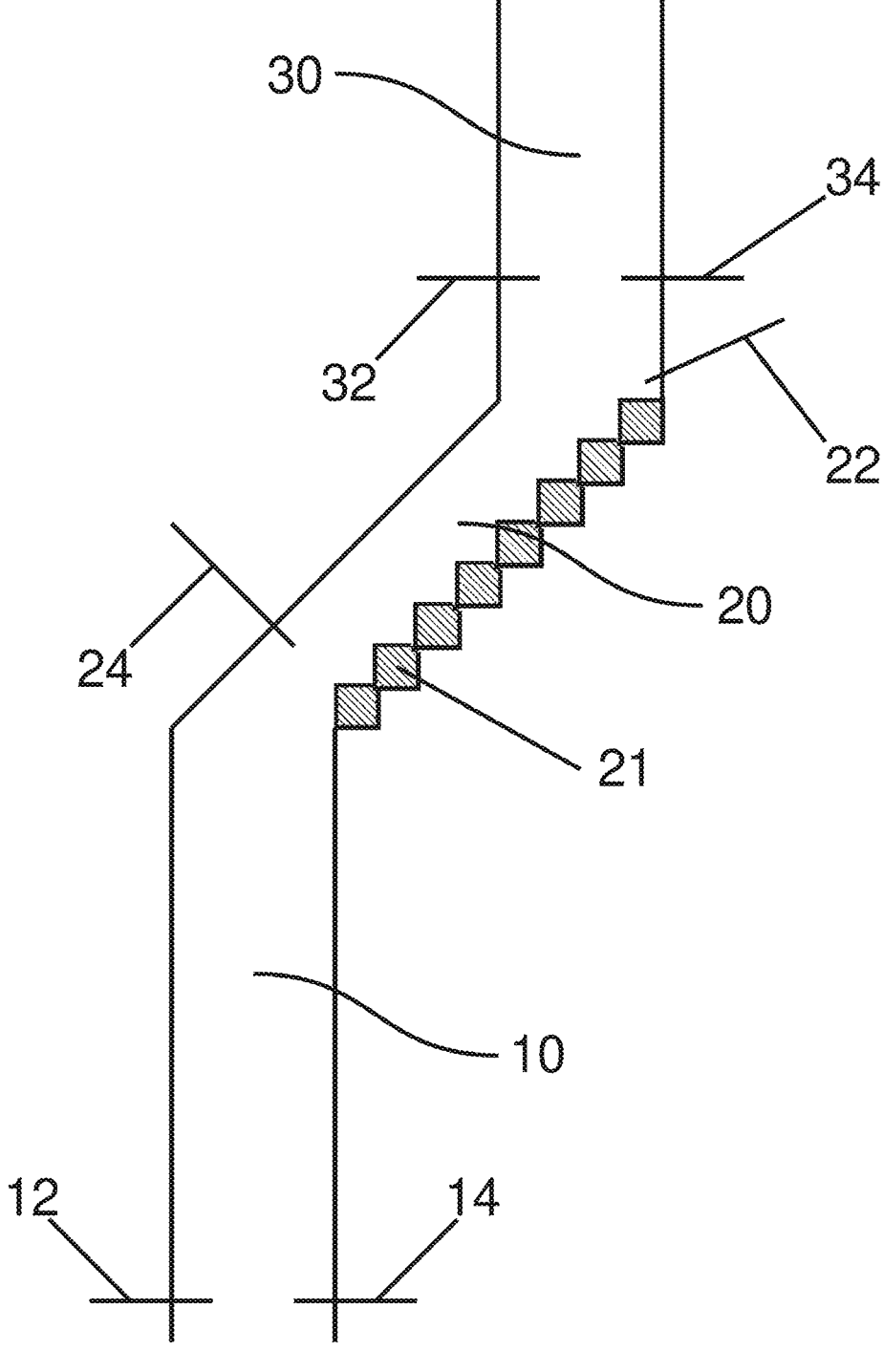
FIG. 4 shows a third calciner.

In the third embodiment of the calciner 110 shown in FIG. 4, the second calciner section 20 has steps 21 for the combustion of a solid fuel. The steps 21 may be level as in the example shown but the steps 21 may also be inclined in the flow direction or counter to the flow direction.

Figure 5:
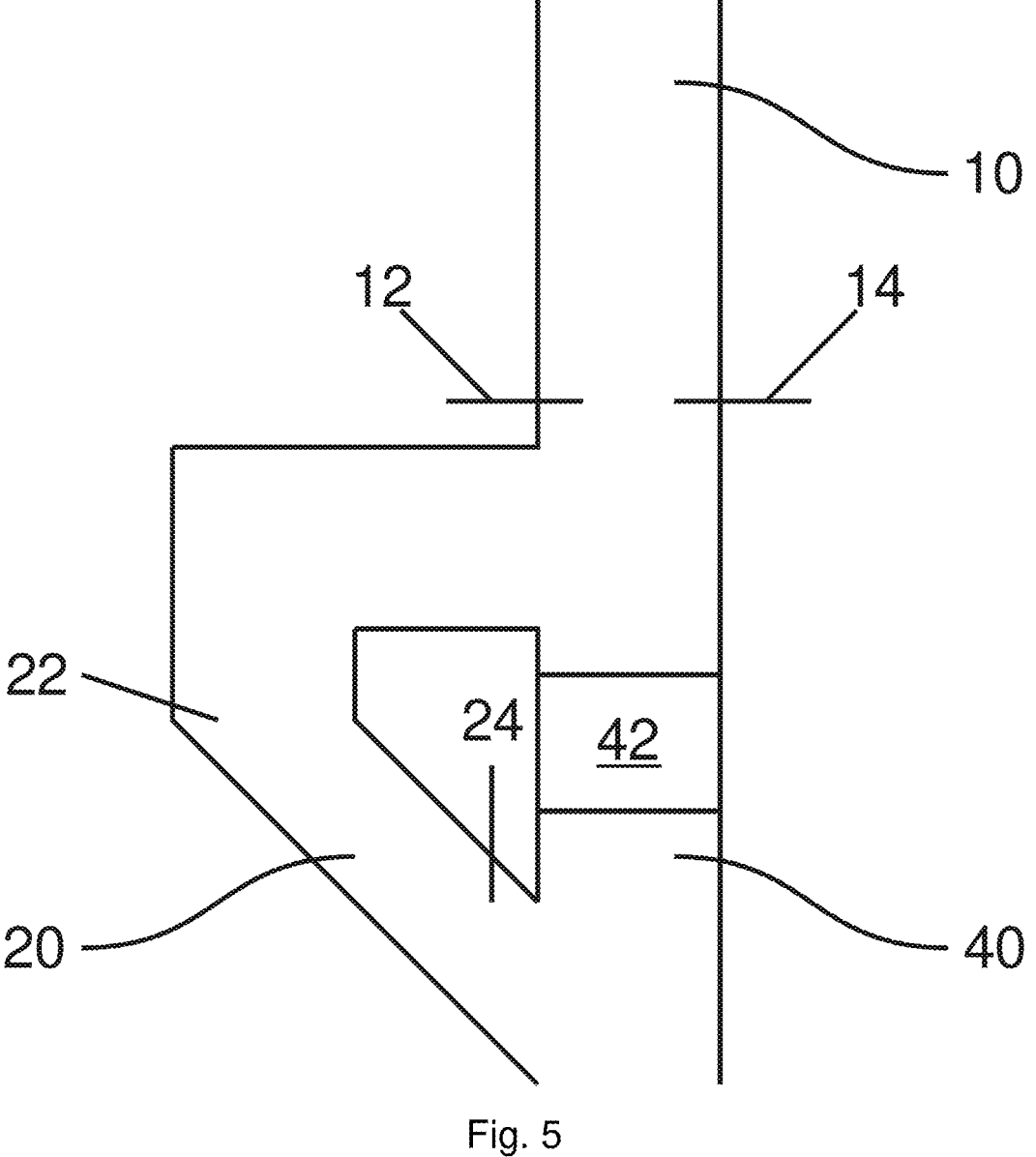
FIG. 5 shows a fourth calciner.

The fourth embodiment of the calciner 110 shown in FIG. 5 has a markedly different construction. The gas stream is initially split and only a substream is passed through the second calciner section 20. A further substream flows past the second calciner section via a bypass and a flow control valve 42 and is recombined with the gas stream exiting the second calciner section 20 and then passed into the first calciner section 10.

LIST OF REFERENCE NUMERALS

10 First calciner section
12 First fuel feed
14 First first starting material feed
20 Second calciner section
21 Steps
22 Second fuel feed
24 First second starting material feed
26 Second second starting material feed
30 Third calciner section
32 Third fuel feed
34 First third starting material feed
40 Bypass
42 Flow control valve
100 Preheater
110 Calciner
120 Rotary kiln
130 Cooler

What is claimed is:

1. An apparatus for thermal treatment of a mineral starting material, comprising:
   a calciner, including at least a first calciner section, a second calciner section, and a third calciner section;
   wherein the first calciner section is arranged vertically;
   wherein the second calciner section is arranged at an incline;
   wherein the third calciner section is arranged vertically;
   wherein the second calciner section has an angle α between the horizontal and a flow direction of the second calciner section;
   wherein the angle α is between 20° and 80°;
   wherein the first calciner section includes a first hydraulic diameter $d_{h,1}$;
   wherein the second calciner section includes a second hydraulic diameter $d_{h,2}$;
   wherein the second hydraulic diameter $d_{h,2}$ is less than or equal to the first hydraulic diameter $d_{h,1}$ multiplied by the sine of the angle α;
   wherein the first calciner section and the second calciner section are configured to have a gas stream flow through them from bottom to top;
   wherein the first calciner is arranged below the second calciner section;
   wherein the third calciner section is arranged above the second calciner section;
   wherein a fuel feed for a solid fuel is arranged at an upper end of the second calciner section;

wherein the lower side of the second calciner section is stepped;
   wherein the second calciner section includes a first starting material feed arranged in the lower 20% of the second calciner section;
   wherein the first starting material feed supplies starting material into the gas stream of the second calciner section from above or from the side.

2. The apparatus of claim 1, wherein the second calciner section includes a second starting material feed, wherein the second starting material feed is arranged in a middle region of the second calciner section, wherein the second starting material feed supplies starting material into the gas stream of the second calciner section from above or into the gas stream of the second calciner section from the side.

3. The apparatus of claim 1, wherein the lower side of the second calciner section includes a moving grate.

4. The apparatus of claim 1, wherein the second calciner section includes an angle α between the horizontal and the flow direction of the second calciner section, wherein the angle α is between 30° and 70°.

5. The apparatus of claim 1, wherein the second calciner section is arranged below the first calciner section and a controllable bypass is arranged parallel to the second calciner section.

6. A process for operating an apparatus according to claim 1, comprising:
   passing a gas stream through the first calciner section and the second calciner section, wherein the Froude number at any point in the second calciner section is equal to or greater than a minimum Froude number in the first calciner section.

7. The process of claim 6, wherein the calciner is operated with an atmosphere comprising less than 25% nitrogen.

8. The process of claim 7, wherein the calciner is operated with an atmosphere comprising less than 15% nitrogen.

9. The process of claim 8, wherein the calciner is operated with an atmosphere comprising less than 10% nitrogen.

10. The process of claim 9, wherein the calciner is operated with an atmosphere comprising less than 5% nitrogen.

11. The process of claim 6, wherein the Froude number in the second calciner section is greater than 0.7 and smaller than 9.

12. The process of claim 6, wherein second calciner section starting material is supplied from at least two positions via a first second starting material feed and a second starting material feed which are spaced apart from one another along the flow direction.

13. The process of claim 6, wherein a solid fuel with a chunk size of at least 90% of the mass of the fuel of more than 50 mm, is supplied in the second calciner section.

14. The process of claim 6, wherein an atomizable fuel is supplied in the first calciner section and starting material is supplied via a first starting material feed in the first calciner section.

* * * * *